United States Patent Office 2,843,797
Patented July 15, 1958

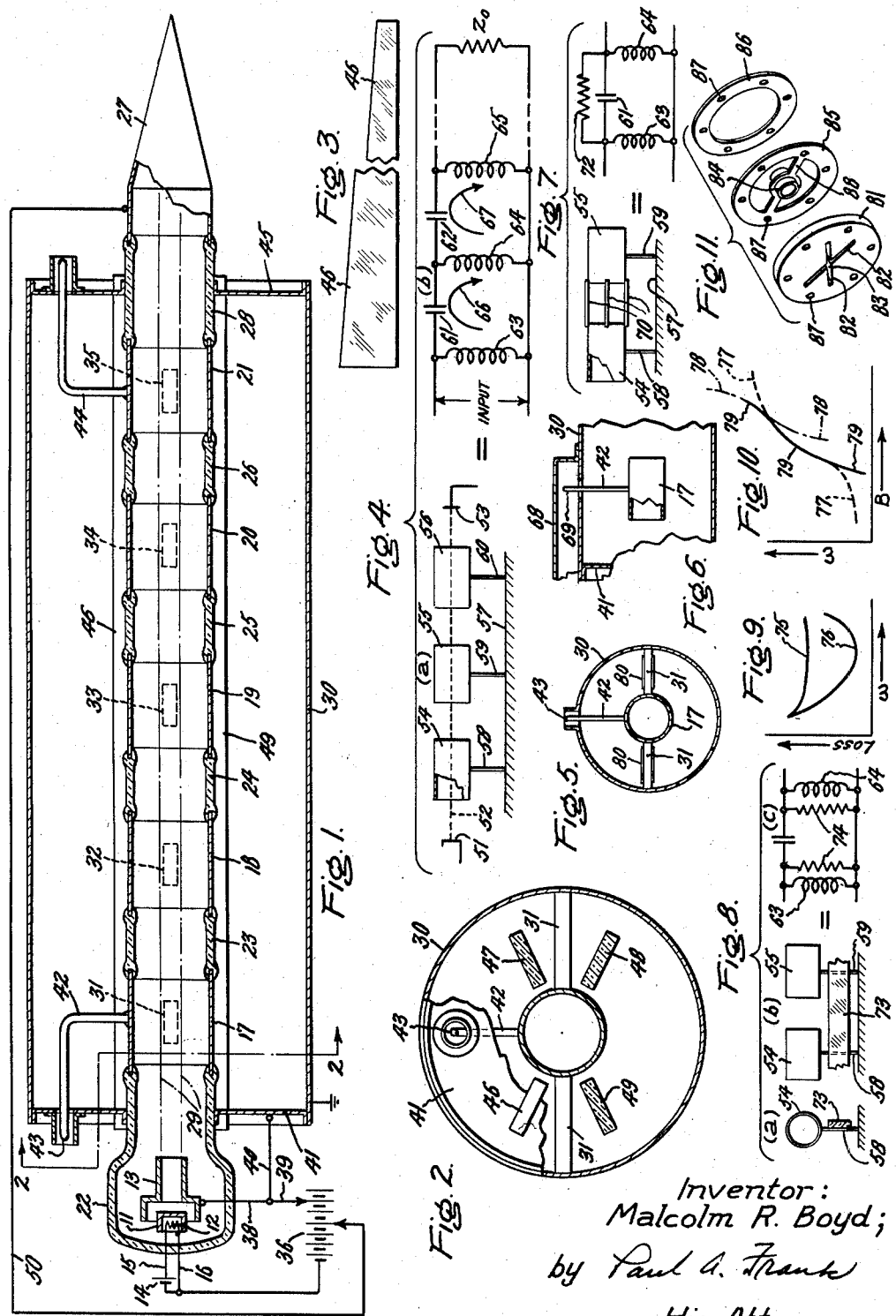
July 15, 1958 — M. R. BOYD — 2,843,797
SLOW-WAVE STRUCTURES
Filed Jan. 25, 1955
Inventor:
Malcolm R. Boyd;
by Paul A. Frank
His Attorney.

2,843,797
SLOW-WAVE STRUCTURES

Malcolm R. Boyd, Schenectady, N. Y., assignor to General Electric Company, a corporation of New York Application January 25, 1955, Serial No. 483,975

18 Claims. (Cl. 315—3.5)

This invention relates to slow wave structures of the periodic type. These structures are ideally suited for use in electron discharge devices commonly defined as traveling wave tubes and, although the structures and methods of this invention are adapted for a wide variety of uses, this invention will be particularly described in connection with traveling wave tubes.

A traveling wave tube consists essentially of a slow wave structure and an electron beam oriented with respect to the slow wave structure so that interaction can take place between an electromagnetic wave on the slow wave structure and the electron beam. Generally, the velocity of the electromagnetic wave in the direction of the electron beam is slightly less than the average electron velocity in the beam so that the electromagnetic wave absorbs energy from the beam.

There are a number of well known slow wave structures, probably the best known types are those which utilize a helix slow wave structure. It is also well known that an electromagnetic wave can be propagated at a reduced velocity along a periodic or filter type structure. These structures are generally easier to fabricate and cool since the dimensions for a given wave length of electromagnetic wave energy are relatively large compared to the conventional helix structure.

In the past, the utilization of periodic filter type structures presented unique problems in backward wave stability, i. e. the ability to operate the tube at high power levels without having the tube break into self-oscillation or produce an output having a high harmonic content. Also, due to the difficulty of obtaining satisfactory input and output impedance matches, the available bandwidth of periodic structures has been relatively limited compared to the relatively wide bandwidth characteristics of helix structures.

It is therefore an important aspect of this invention to take advantage of the inherently high impedance levels associated with periodic structures and at the same time provide broad band coupling and satisfactory stabilization of these structures.

Therefore it is an important object of this invention to provide an improved slow wave structure.

It is a further object of this invention to provide an improved slow wave structure of the periodic type including a method and apparatus for wide band coupling of electromagnetic wave energy to the structure.

A further object of this invention is to provide an improved slow wave structure including a method and apparatus for obtaining substantially ideal input and output termination of the structure.

An additional object of this invention is to provide an improved slow wave structure with an improved method and apparatus for stabilization.

Another object of this invention is to provide an improved slow wave structure including a method and apparatus for accomplishing effective wide band electromagnetic wave coupling to the structure and stabilization of the structure.

According to an aspect of this invention there is provided a slow wave structure including spaced interaction elements coupled to a common conductor by coupling means substantially oriented in at least one common plane to form a plurality of periodic filter sections. A wide band electromagnetic wave energy coupling means is provided for coupling energy between an external source and the slow wave structure by coupling to a single filter section only and stabilization is provided by effectively shunt loading the filter sections.

The other objects and important aspects of this invention will become apparent from the following specification and claims when considered with the drawing wherein Figure 1 illustrates an embodiment of this invention showing a periodic structure in a traveling wave tube; Figure 2 illustrates a view looking along section 2—2 of Figure 1; Figure 3 illustrates an exemplary embodiment of a stabilizing attenuator; Figure 4 illustrates an equivalent diagram and circuit of the periodic structure illustrated in Figure 1 useful in explaining the operation of this invention; Figures 5 and 6 illustrate modified forms of wide band coupling means and Figures 7, 8, 9 and 10 are diagrammatic illustrations useful in explaining the methods and apparatus for stabilizing the operation of a periodic slow wave structure and Figure 11 illustrates an exploded view of an alternative embodiment of a slow wave structure in accordance with this invention.

Figures 1, 2 and 3 illustrate an example of an embodiment incorporating features of this invention. There is illustrated an electron gun consisting of electron emitting cathode 11, heater 12 and accelerating electrode 13. Heater power is supplied by power supply 14 through leads 15 and 16. Lead 16 is also coupled to the electron emitter 11. The electron beam from the electron gun 11 is caused to pass through a series of electron beam interaction elements herein illustrated as cylinders or tunnels 17, 18, 19, 20 and 21. These tunnels are selected so as to provide optimum beam coupling, i. e. coupling between the electron beam and the electromagnetic wave energy propagated along the periodic filter structure which includes these interaction elements. The interaction elements are sealed to the glass or ceramic electron gun housing 22 and are sealed to each other by glass cylinders 23, 24, 25 and 26 respectively. The last cylinder is coupled to a water cooled electron collector 27 by glass cylinder 28 to thereby complete the evacuated system through which the electron beam 29 travels from the cathode 11 through electron gun 13, the interaction elements, and is finally collected by collector 27. The glass-to-metal seals can be formed in any well known manner of forming this type seal and the vacuum enclosure can be made of any satisfactory non-conducting material such as glass or ceramic.

In order to complete the periodic structure the completed vacuum enclosed portion of this system is supported within a common cylindrical conductor 30, which is formed into a substantially coaxial cylinder of conducting material such as, for example, brass or copper, which surrounds the electron beam interaction elements. Each interaction element is separately coupled to the surrounding cylinder 30 by means of flexible conducting supporting legs 31, 32, 33, 34 and 35. It is noted that these flexible supporting legs extend in substantially the same plane. The manner of supporting the vacuum enclosure within the common conductor 30 by means of these supporting legs can be visualized more easily from an inspection of Figure 2 of the drawing.

A direct current power supply 36 provides the direct current potentials for the operation of this interaction device. The direct current accelerating potential is provided to accelerating electrode 13 by lead 38 through tap 39 and it will be noted that the interaction elements are also maintained at the same potential by lead 40 which makes contact with end plate 41. It will be apparent that the traveling wave tube can be provided with a conventional axial magnetic focusing field to focus the electron beam. An illustration of the means for providing such a field has been dispensed with in order to simplify the description of this invention.

Electromagnetic wave energy is coupled into the periodic structure by means of conducting connector 42 which is conductively connected to the first interaction element 17, runs parallel to end plate 41 and then extends at right angles to pass through end plate 41. Since the connector 42 extends along end plate 41 which is conductively connected to a common conductor 30 there is thereby formed an effective transmission line section which is substantially perpendicular to the plane of the coupling means such as 31 which couple the interaction elements to the common conductor. A corresponding output lead 44 extends parallel to and then out through end plate 45.

In Figures 1 and 2 there are shown attenuator cards 46, 47, 48 and 49 which are coupled to the coupling means to provide the necessary stabilization for the complete interaction device. For example, a tapered attenuator card 46, consisting of a dielectric sheet with a coating of high loss material, is shown in Figure 3. These attenuator cards extend through and make contact with the end plates 41 and 45 and are coated with a high loss material such as a layer of tin chloride on a glass plate or titanium dioxide on a ceramic plate. By utilizing cards of the type herein illustrated it is possible to vary the thickness of the attenuator coating in an axial as well as a radial direction in order to achieve optimum stabilization of the interaction device. In addition, the location of the cards external to the vacuum enclosure makes possible easy adjustment of the attenuation and the utilization of a large volume attenuator so that heat generated in the attenuator is easily dissipated.

The apparatus illustrated in Figures 1 and 2 is operated by coupling an electromagnetic wave to be amplified to the coaxial input 43. This wave travels along the periodic structure, formed by the interaction elements and coupling means, at a velocity determined by the inductive and capacitive characteristics of the structure. As electrons in the beam move down the axes of the interaction elements they interact with the electromagnetic waves so that an amplified output can be obtained from output connector 44. After interacting with the electromagnetic wave, electrons in the electron beam 29 are collected by collector 27 which, in order to effect increased efficiency, is maintained at a slightly lower potential than the accelerating electrode 13 and the interaction elements. The potential is applied to this collector by lead 50 which is connected to power supply 36. It is apparent that the voltages applied to this structure can be varied for optimum operation as can the heater current and the form and loss characteristics of the stabilization attenuators.

As an example of a specific embodiment of this invention the apparatus illustrated in Figure 1 can be considered to consist of an electron gun and collector structure operating at approximately 20,000 volts with the electron beam passing through cylindrical tunnels having an inside diameter of the order of one inch and surrounded by an outer common coaxial conductor 30 having an inside diameter of the order of six inches. This tube is designed to operate throughout the frequency range of approximately 600 megacycles to 900 megacycles and attenuation in the order of five decibels per section is provided by two resistance cards properly oriented to couple to the conductive legs 31 through 35 inclusive which support and electrically connect the interaction sections to the common conductor. A traveling wave tube of this type will provide an output in the order of 40 kilowatts at an efficiency in the order of 25 percent.

It will be readily appreciated that the periodic structure thus far described is subject to a large number of variations and modifications without departing from the spirit of this invention and, in particular, it is noted that the entire periodic structure formed by the common conductor 30 and the coupling means between the interaction elements and this outer common conductor can all be enclosed in a common evacuated envelope along with the necessary stabilization attenuators; however, the structure herein illustrated is particularly adapted for rugged construction and easy dissipation of heat since relatively few electrical connections have to be made through the vacuum envelope.

Figure 4 is useful in describing the operation of the periodic structure illustrated in Figure 1. There is illustrated an equivalent electron gun 51 providing an electron beam 52 which is collected by collector 53 after having traveled through interaction elements 54, 55 and 56. These interaction elements are coupled to a common conductor 57 by means of separate coupling or connecting means 58, 59 and 60.

It is readily apparent that the cylinders 54, 55 and 56 are the full equivalent, for example, of the interaction elements 17, 18 and 19, of the periodic structure illustrated in Figure 1 and that the conductors 58, 59 and 60 are the full equivalent, for example, of the supporting straps 31, 32 and 33. And further, that the common conductor 57 herein shown as a ground plane is the full equivalent of coaxial conducting cylinder 30 which in the case of Figure 1 was provided in coaxial form to reduce the tendency of the structure to radiate.

It can easily be shown that the structure illustrated in Figure 4a is, therefore, the equivalent of that illustrated in Figure 1 and further that the classic filter structure illustrated in Figure 4b is the equivalent of the structure illustrated in Figure 4a. It should be appreciated that this equivalency obtains only over the propagation frequency range since the shunt elements are inductances only if the length thereof is less than one quarter wave length or odd multiples thereof.

The fringing electric fields between, for example, 54 and 55 result in an effective capacitance 61 therebetween and likewise an effective capacitance 62 between cylinders 55 and 56. In a like manner, the pairs of conductors, for example, 58 and 59, if a length less than one quarter wave length throughout the operating frequency range, constitute an inductive transmission line thereby providing mutual inductance elements 63, 64 and 65.

Thus, if an input signal is applied across element 63, it will be propagated along the structure in a well known manner and, if the transmission line is terminated by its characteristic impedance $Z_0$, there will be no reflections. The electromagnetic wave in traveling from the input to this terminating impedance establishes circulating electromagnetic fields illustrated by arrows 66 and 67. Therefore, by using derived impedances (capacitive and inductive) a filter-theory analysis of the periodic structure is possible and greatly simplifies further discussion of this novel coupling and stabilizing method and apparatus.

Thus, the basic circuit illustrated in Figure 4 consists of a series capacity element through which an electron stream passes and a short-circuited transmission line shunted by a capacitance. The capacitance abovementioned is that between successive interaction elements. Action between the traveling wave on the periodic structure and the electron beam takes place in these gaps between the interaction elements. From conventional filter theory, the propagation constant of such a filter section, which defines the attenuation of a wave traveling along the section and the phase shift per section, can be written as:

$$\sin^2 \frac{\beta D}{2} = \frac{Z_1}{4Z_2} = \frac{1}{4\omega C Z_0 \tan kL}$$

where $\beta D$ is the phase shift per section, C is the series capacitance, $\omega$ is the frequency, $$Z_1 = \frac{1}{j\omega C} \text{ (series capacity)}$$

$Z_2 = jZ^0 \tan kL$ (shunt shorted transmission line).

In view of the foregoing, it is readily apparent that the length of the coupling means, such as 31 in Figures 1 and 2, or connectors 58 and 59 in Figure 4 in combination with the spacing between the interaction elements determines the propagation characteristics of the transmission system and the bandwidth of this system.

In a like manner, by means of well known design parameters optimum coupling between the electrons in the electron beam and the eletromagnetic wave energy traveling along the periodic structure can be obtained by designing the interaction elements such as 17 and 18 in Figure 1 of proper diameter and length for optimum coupling. This along with the average velocity of the electrons in the electron beam is then correlated with the design parameters of the periodic structure to obtain an overall band pass system of a filter type periodic structure wherein the electromagnetic wave traveling along the effective filter sections is amplified by interaction with the electron beam.

It is apparent from a consideration of simple filter structures that slow waves will propagate along structures having large values of the product of inductance and capacitance per unit length. The other characteristic of importance, the impedance of the circuit which is related to the gain of the device when utilized in a traveling wave tube, depends on the ratio of the inductance to capacitance. It is therefore apparent that inductive loading should be maximized for optimum performance and this is effectively accomplished by means of the individual coupling means such as 31 and 32 which couple the interaction elements 17 and 18 to the common conductor 30 to provide short-circuited two wire transmission lines as inductive elements.

To obtain large bandwidth and frequency range it is essential that the phase velocity of propagation be fairly constant over a wide range of frequencies and that the impedance likewise be fairly constant over the range. It can easily be shown, from a filter theory approach to the analysis of the resulting circuit, that by obtaining the proper relations between the elements making up the periodic structure it is possible to obtain these desired characteristics over a 40 percent frequency range and over a wide portion of the electromagnetic wave energy spectrum with a center band impedance comparable to that of a helix designed to operate over the same frequency range.

It is also noted that consideration of the equivalent circuit illustrated in Figure 4b in combination with classic filter theory indicates that, if the transmission line is terminated with the characteristic impedance $Z_0$, the input impedance appears to be the same as this characteristic impedance so that there is substantially no wave energy reflected from the terminating impedance.

Thus, it is apparent that, in order to obtain optimum transmission of the electromagnetic wave energy along the periodic structure, a means must be devised to effect as nearly as possible termination of the periodic structure in its characteristic impedance and to couple the output and input termination to the end sections only of the periodic structure. By accomplishing this form of coupling between the periodic structure and an external source or external load a very broad band termination is effected and relatively high values of impedance and corresponding efficiency are obtained. A portion of this problem is solved by coupling the electromagnetic wave energy to the final section of the periodic structure without in any way affecting the fields of the other sections by direct coupling thereto so that there is minimum direct interaction with the electromagnetic fields associated with adjacent sections of the periodic structure.

Previously known methods of coupling wave energy into or out of the periodic structure have consisted essentially of coupling directly to the electromagnetic fields established in the periodic structure when an electromagnetic wave is propagated along the structure. These may consist essentially of a simple loop coupler within the region of the electromagnetic fields or alternatively in a direct connection to an inductive leg such as a coupling member 31. This form of coupling obviously directly affects the fields associated with other than the end sections of the transmission line and results in a narrower band pass system and a narrower band pass electromagnetic wave energy connector.

In accordance with this invention there is provided a novel means of coupling to the end section or to any desired section of the periodic structure without affecting the electromagnetic fields associated with the other sections so as to result in relatively very broad band coupling and a periodic structure which can be operated over a wide frequency range with a substantially flat gain characteristic. The examples of coupling systems hereinafter described, in accordance with this invention, are well matched over the entire pass band with relatively low voltage standing wave ratios, for example, considerably less than two.

A reconsideration of the exemplary apparatus illustrated in Figures 1 and 2 readily indicates that the electromagnetic fields, associated with an electromagnetic wave propagated along the periodic structure, are confined substantially to the plane of the coupling members 31, 32, 33, 34 and 35. In view of the fact that the couplers extend to either side of the interaction elements, there is substantially no electromagnetic field associated with the electromagnetic wave which lies in a plane substantially perpendicular to these coupling members. Thus, by providing a conductive coupler, such as connector 42, in a plane substantially perpendicular to the plane of the electromagnetic fields associated with the traveling wave and connecting this to a capacitive element, such as interaction element 18, there is coupling to the periodic structure but no direct coupling to or interaction with the aforementioned electromagnetic fields.

In addition the conducting connector 42 runs parallel to the end plate 41 so as to provide a separate transmission line running at right angles to the aforementioned electromagnetic fields and thereby further reduces the tendency of the input to react with these fields. The coaxial line input can be designed to have the characteristic impedance of the periodic structure and therefore effect maximum power transfer through the structure over a wide range of frequencies. In a like manner, the output connector 44 is coupled to interaction element 21, which also acts as a capacitive plate of one of the capacitive elements in the periodic structure, and energy is extracted through the transmission line formed between connector 44 and plate 45. Thus, by having an output load matched to the characteristic impedance of the structure, a substantially reflectionless and relatively stable periodic structure is effected.

It will be readily apparent that the supporting legs may not lie in the same plane and that there may be more than two legs for such interaction element. For example, there may be four or six of such supporting legs or coupling means; however, substantially the same results can be achieved by orienting groups of the supporting legs in respective common planes. The electromagnetic wave energy is then coupled to and from the periodic structure by causing the input lead to make contact with an interaction element in a region of minimum electromagnetic field strength due to an electromagnetic wave propagated along the line.

Figures 5 and 6 illustrate by way of example modifications of the coupling system illustrated in Figures 1 and 2. In these figures parts similar to those illustrated in Figure 1 are designated by the same reference numerals. Figure 5 illustrates electromagnetic wave energy connector 42 extending through the outer wall of the common conductor 30. This connector is provided with a properly tapered end portion 43 for coupling to a coaxial line. Figure 6 illustrates another modification wherein the electromagnetic wave energy connector 42 extends through the outer wall of common conductor 30 and into a wave guide section 68 so that projecting end portion 69 excites an electromagnetic wave in the wave guide. It will be readily apparent that a wave guide could be coupled to the connector illustrated in Figure 1 and that the forms of coupling herein described by way of example are only a few of the many varieties of methods and apparatus for coupling electromagnetic wave energy to and from a periodic structure by coupling to an end section only with a minimum of direct coupling to or interference with the electromagnetic fields associated with the other sections of the periodic structure when electromagnetic wave energy is propagated along the structure. In addition it should be apparent that this form of broad band coupling can be utilized with other forms of periodic structures. For example, this form of coupling is suited for coupling to structures utilizing annular electron beams such as those disclosed in a copending patent application by G. R. Branch, Jr. and M. R. Boyd, Serial No. 483,976, filed herewith and assigned to the same assignee as this invention.

In interaction devices of the type illustrated in Figures 1 and 2 it is generally necessary to provide additional means for stabilization with respect to forward and backward wave oscillations. In a tube of this type a slight mis-match between the load and the periodic structure often results in a backward traveling wave which, if proper phase shifting conditions are present, and the beam voltage is sufficiently high, can result in a feedback signal which causes the interaction device to self-oscillate. In addition, reflected waves can result in the establishment of undesired harmonics in the output.

For example, a tube of the type illustrated in Figure 1 will backward wave oscillate above a critical electron beam voltage depending on the beam density and size, although this can also be varied by adjusting the magnetic focusing field (not shown). The effect of beam size on stability can be explained qualitatively by considering the enhanced coupling between a periodic structure and the beam which occurs when the beam is expanded or when the same size beam is accelerated by increasing the operating voltage.

Generally, it is necessary to introduce stabilizing means which may take the form of attenuators which are coupled in some fashion to the periodic structure. These attenuators substantially eliminate backward traveling wave energy since the backward traveling wave energy is generally of a considerably lower level and can be completely dissipated in the attenuator without decreasing the level of the forward traveling wave energy below usable levels.

Theoretical considerations indicate that it is advantageous to introduce a resistive component into the inductive elements of a periodic structure rather than into the capacity elements. This can be understood more clearly by a consideration of Figures 7 and 8 of the drawing wherein like elements of the structure illustrated in Figure 4 are designated by the same reference numerals. Figure 7 illustrates the conditions which obtain when a resistance or attenuator is introduced in the capacitive element, i. e. this may be termed series loading or attenuation.

A resistance element or a plurality of high loss rod elements 70 are introduced between the interaction elements 54 and 55 so as to introduce a series resistance in the circuit. Conventionally, this is often accomplished in both periodic structures and in helices by applying an aquadag or other lossy coating in proximity to the periodic structure or, in the case of a helix, in proximity to the helix. The resulting equivalent circuit is illustrated wherein a resistance 72 corresponds to the combined effect of resistance elements 70.

In a like manner, Figure 8 illustrates the introduction of loss or attenuation in the inductive elements. As herein illustrated the plane in close proximity to or lying between legs 58 and 59 is filled with lossy dielectric 73 or dielectric coated with a lossy film. Alternatively legs 58 and 59 can be made from material having high resistivity, such as stainless steel, or of dielectric material coated with lossy film. This results in an equivalent circuit wherein there are introduced across the equivalent filter circuit, resistance elements 74. This may be termed shunt attenuation and is accomplished by coupling high loss material to the inductive elements of the periodic structure.

Although the method of applying an attenuator to a periodic structure in the form of series attenuation is often more convenient it is attended by a number of serious disadvantages. In view of the close proximity of the resistive element to the electron beam there is a tendency for what is known as a resistance wall effect to obtain wherein the attenuator becomes saturated with current induced as a result of the electron beam passing in close proximity. This saturated attenuator then is relatively incapable of attenuating properly the electromagnetic wave components traveling along the periodic structure.

In addition, at high frequencies a very small volume of attenuator is needed and thus the ability to reproduce a satisfactory thin film, particularly within the vacuum enclosure, becomes difficult. Furthermore, a consideration of the classic filter structure indicates that the introduction of a resistance in series, i. e. bridging the capacitive element of the circuit, has a more adverse affect on the designed phase velocity of the structure and the resulting ease of matching impedances to the structure.

The utilization of shunt attenuation in combination with a periodic structure of this type overcomes a number of the inherent limitations of the series type attenuation. For example, the volume attenuation effected by applying an aquadag coating or introducing a volume attenuator in the region of the conductive elements results in an attenuator which is substantially decoupled from the electron beam and therefore is less likely to be affected by the above-mentioned resistance wall effect. With the attenuators hereinafter described there is substantially no resistance wall effect, since they are substantially decoupled from the electron beam. Also, as can be shown theoretically, a flatter loss characteristic as a function of frequency is obtained.

This is readily apparent from a consideration of the curves in Figure 9 wherein the upper curve 75 which corresponds to shunt attenuation is substantially flat over a wide range of frequencies whereas the lower curve 76 corresponding to series attenuation is subject to a wide variation in loss as a function of frequency.

In addition, there is less effect upon the propagation characteristics of the structure when resistance is introduced in the inductive element. This may be substantiated from classic filter theory and, by way of example, is illustrated by the curves in Figure 10 of the drawing wherein the no-loss curve 77 follows the conventional desired cosine function wherein phase shift $\beta$ is plotted as a function of frequency $\omega$. Curve 78 illustrates the sharp drop-off when series attenuation is utilized and curve 79 illustrates the more nearly desirable phase shift characteristics of shunt attenuation.

An additional and very practical consideration is that by utilizing a volume attenuator which couples to the inductive elements of the periodic structure a large physical volume is available for attenuation so that large amounts of heat can be dissipated easily and the reproducibility of the attenuator is considerably simplified.

Examples of volume attenuators are illustrated in Figures 2, 3 and 5 respectively. Figures 2 and 3 illustrate a form of volume attenuator consisting of strips of dielectric material, for example, glass or ceramic on which a lossy or resistive coating has been applied and as has been shown from the curves in Figure 10, this method of introducing attenuation does not greatly affect the propagation characteristics of the stabilized section. In addition, by utilizing structure of the type illustrated in Figures 1 and 2 it is possible to easily change the attenuators and vary them in order to achieve optimum operating conditions.

The stabilizing attenuator which forms an embodiment of this invention consists of a resistance card or a plurality of resistance cards on which the resistance has been tapered radially.

In addition, it is often observed in structures of this type that the low frequency high gain fields associated with the electromagnetic wave propagated along the structure tend to saturate the attenuator and consequently reduce the efficiency. Therefore, one or more of the cards can be provided with a limited region of coating so as to, in effect, provide a short attenuator for low frequencies and then a longer attenuator for the middle and high frequencies in the range.

It is readily apparent that the attentuator cards can take a wide variety of shapes and that they may be formed having sections of the attenuator material only in the immediate region of the coupling members or can be designed to have attenuator material extending over the entire length of the card and be coupled to the end plates when passing therethrough. Also, one or more cards may be used and arranged at various angles with respect to the coupling means 31, for example. In addition, it is readily apparent that these can be utilized in structures having conductive elements extending in more than one plane, the primary requisite being that they are coupled to the inductive elements and substantially decoupled from the electron beam traveling along the structure.

Figure 5 illustrates a modified form of shunt attenuation wherein an aquadag or high loss coating is applied directly to the dielectric coupling means 31 and is generally illustrated by heavy coating 80 surrounding these members. It is readily apparent that an alternative form of this coating might consist of the utilization of support members 31 having inherent high loss characteristics. Thus it will be apparent that there is provided shunt attenuation since the attenuating means or members are oriented in the electromagnetic fields established along the periodic structure.

It is noted that the methods of attenuation and attenuators herein described are ideally suited for utilization in structures incorporating an annular electron beam, such as, for example, the structures disclosed in the aforementioned copending application Serial No. 483,976.

Figure 11 illustrates an enlarged showing of an embodiment of this invention in the form of an exploded view of a portion of a periodic structure which is made entirely of conducting material. An end plate 81 is provided with slots 82 to mount appropriate volume attenuators and is provided with an orifice 83 through which an electron beam can pass to each of the interaction elements such as 84. The interaction elements are formed out of thin sheet stampings 85 which are mounted between washer members such as 86. The entire slow wave structure is assembled by passing bolts or rivets through holes 87

This structure is designed for operation at a frequency in the order of 8500 megacycles at an operating voltage of approximately 2500 volts. At this frequency and operating voltage, the tunnel diameter is in the order of 100 mils and the connecting legs 88 are approximately 250 mils each so as to provide a complete slow wave structure in the order of ¾ of an inch in diameter with a center-to-center spacing between the interaction elements of approximately 100 mils.

It is therefore apparent that there is provided a rugged interaction device for operation at high frequencies over a large frequency range with a power dissipation ability limited only by available electron beam current density and the ability of the structure to dissipate heat.

In view of the foregoing, it is apparent that there is provided an apparatus and method of coupling to and stabilizing this apparatus whereby essentially non-resonant operation of a slow wave structure is effected over frequency ranges comparable to those of helix type structures. In addition the large physical size and relatively rigid construction permit operation at high power levels without excessive heat dissipation problems obtaining and furthermore permits the utilization of a structure having a higher theoretical gain per unit length and a higher efficiency than obtaining in presently known helix traveling wave tubes.

The foregoing embodiments of this invention are considered to be merely exemplary of the inventive methods and apparatus of my invention and, therefore, in the appended claims it is intended to cover all such modifications and variations as come within the true spirit and scope of this invention.

What I intend to protect by Letters Patent of the United States is:

1. In a traveling wave interaction device a slow wave structure comprising an elongated conductor, spaced interaction elements coupled to said common conductor by coupling means extending between said conductor and said interaction elements in a direction generally perpendicular to said conductor to form a plurality of periodic filter sections, said coupling means having limited extent in a direction transverse to said elongated conductor, means for coupling electromagnetic wave energy between an external circuit and a single filter section only of the slow wave structure, said last-mentioned means being circumferentially displaced from said coupling means to minimize the field common to said coupling means and said last-mentioned means and means for shunt loading said filter sections to thereby stabilize the interaction device.

2. In a traveling wave interaction device including means for producing a beam of electrons, a slow wave structure comprising an elongated common conductor, a plurality of electron beam interaction elements, a plurality of coupling means coupling each of said elements to said common conductor, said coupling means extending between said common conductor and said elements in a direction substantially perpendicular to said common conductor and having limited circumferential extent so that the electromagnetic fields associated with said elements and coupling means, when an electromagnetic wave is propagated along the structure, are substantially confined to the region adjacent said coupling means, the combination of said coupling means and interaction elements forming periodic filter network, an electromagnetic wave energy connector coupled to a portion of said slow wave structure and circumferentially displaced from said coupling means for minimum interaction with said electromagnetic fields associated with adjacent sections, and an attentuator oriented to provide shunt loading of said network to thereby stabilize said interaction device, said attentuator structure being oriented so as to have substantially no interaction with the electron beam.

3. In a traveling wave interaction device including means for producing a beam of electrons, a slow wave structure comprising a common conductor, a plurality of electron beam interaction elements, coupling means coupling each of said elements to said common conductor, said coupling means having limited circumferential extent and extending generally radially between said common conductor and said interaction elements so that the electromagnetic fields associated with said elements and coupling means are substantially confined to a circumferential region adjacent said coupling means and an electromagnetic wave energy connector coupled to a portion of said slow wave structure and displaced circumferentially from said coupling means to provide minimum interaction with said electromagnetic fields associated with coupling means.

4. In a traveling wave interaction device including means for producing a beam of electrons, a slow wave structure comprising a common conductor, a plurality of electron beam interaction elements, a plurality of coupling means of limited circumferential extent coupling each of said elements to a common conductor, groups of said coupling means being positioned in a common plane so that the electromagnetic fields associated with said elements and coupling means are substantially confined to said common plane, and an electromagnetic wave energy conductor coupled to a portion of said slow wave structure and circumferentially displaced from said plane to provide minimum interaction with said electromagnetic fields associated with adjacent portions.

5. In a traveling wave interaction device including means for producing a beam of electrons, a slow wave structure comprising a plurality of electron beam interaction elements oriented along and surrounding said beam, a common conductor surrounding and substantially coaxial to said interaction elements, a plurality of coupling means each having limited circumferential extent coupling each of said elements to the common conductor, groups of said coupling means positioned in a common plane so that the electromagnetic fields associated with said elements and coupling means when an electromagnetic wave is propagated along said structure are substantially confined to said common plane of the coupling means and an electromagnetic wave energy connector coupled to a portion of said slow wave structure and angularly displaced with respect to said plane to provide minimum interaction with said electromagnetic fields associated with adjacent portions.

6. In a traveling wave interaction device including means for producing a beam of electrons, a slow wave structure comprising a plurality of electron beam interaction elements surrounding the electron beam and oriented along the beam, a common conductor coaxial to said elements and surrounding the elements, a plurality of coupling means coupling each of said elements to the common conductor, said coupling means being oriented in a plane so that the electromagnetic fields associated with said elements and coupling means when an electromagnetic wave is propagated along the structure are substantially confined to said plane and an electromagnetic wave energy connector coupled to a portion of said slow wave structure and having at least a portion thereof substantially perpendicular to the plane of the coupling means to effect minimum interaction between said connector and the electromagnetic fields associated with adjacent portions.

7. In a traveling wave interaction device including means for producing a beam of electrons, a slow wave structure comprising a plurality of electron beam interaction elements, a common conductor surrounding said interaction elements, a plurality of coupling means coupling each of said elements to the common conductor, said coupling means having limited circumferential extent and being positioned in a plane so that the electromagnetic fields associated with said elements and coupling means, when an electromagnetic wave is propagated along the slow wave structure, are substantially confined to said plane, a conducting plate substantially perpendicular to the electron beam and the plane of said coupling means connected to the common conductor, and an electromagnetic wave energy connector coupled to a portion of said slow wave structure and extending for a portion of its length angularly displaced from the plane of the coupling means and substantially parallel to said plate so as to form an effective transmission line between the connector and the plate and effect minimum interaction with the electromagnetic fields associated with adjacent portions.

8. A traveling wave interaction device of the type defined by claim 7 wherein the electromagnetic wave energy connector extends through the end plate.

9. A traveling wave interaction device of the type defined by claim 7 wherein said electromagnetic wave energy connector extends through said common conductor.

10. In a traveling wave interaction device of the type defined by claim 7 wherein said electromagnetic wave energy connector extends through the common conductor and into a wave guide whereby electromagnetic wave energy is coupled between the slow wave structure and the wave guide.

11. In a traveling wave interaction device including means for producing a beam of electrons, a slow wave structure comprising a common conductor, a plurality of electron beam interaction elements, a plurality of coupling means coupling each of said elements to said common conductor, the combination of said coupling means and interaction elements forming a periodic filter network, said coupling means having a limited circumferential extent and extending generally perpendicular to said common conductor and high loss attenuator material coupled to and extending along at least one of said coupling means to provide shunt loading of said network and thereby stabilize the interaction device.

12. In a traveling wave interaction device including means for producing a beam of electrons, a slow wave structure comprising a plurality of electron beam interaction elements, a plurality of coupling means coupling each of said elements to a common conductor, groups of said coupling means being oriented substantially in at least one common plane so that the electromagnetic fields associated with said elements and coupling means when an electromagnetic wave is propagated along the structure are substantially confined to said common plane, the combination of said coupling means and interaction elements forming a periodic structure and an attenuator coupled to the coupling means to provide shunt loading of said periodic structure and thereby stabilize the interaction device with minimum interaction between said electron beam and the attenuator.

13. In a traveling wave interaction device including means for producing a beam of electrons, a slow wave structure comprising a plurality of electron beam interaction elements, a plurality of coupling means coupling each of said elements to a common conductor, said common conductor being coaxial to and surrounding the interaction elements and said coupling means being oriented in substantially the same plane so that the electromagnetic fields associated with said elements and coupling means, when an electromagnetic wave is propagated along the structure, are substantially confined to the plane of the coupling means, the combination of said coupling means and interaction elements forming a periodic filter network, a conducting plate substantially perpendicular to the electron beam and the plane of the coupling means connected to the common conductor and an attenuator structure connected to said end plate and extending in a direction substantially parallel to the electron beam in proximity to the coupling means to provide shunt loading of said network and stabilize the interaction device, said attenuator structure being isolated from the electron beam to reduce the tendency of the attenuator structure to saturate due to interaction with the electron beam.

14. In a traveling wave interaction device including means for producing a beam of electrons, a slow wave structure comprising a plurality of electron beam interaction elements surrounding the electron beam, a common conductor surrounding the interaction elements in substantially coaxial relation with the interaction elements, a plurality of coupling means coupling each of said elements to said common conductor, said coupling means extending generally radially between said common conductor in said interaction elements and having a limited circumferential extent so that the electromagnetic fields associated with the elements and coupling means when electromagnetic wave energy is propagated along the structure are confined to the circumferential region adjacent said coupling means, the combination of said coupling means and interaction elements forming an effective periodic filter network, a conducting plate oriented substantially perpendicular to the electron beam and the plane of the coupling means and connected to the common conductor, an electromagnetic wave energy connector coupled to a portion of the slow wave structure circumferentially displaced from said coupling means and extending perpendicular to said plane, along a portion of its length parallel to the conducting plate and then through the conducting plate to effect minimum interaction between the connector and the electromagnetic fields associated with adjacent portions and an attenuator structure coupled to the conducting plate and the coupling means to provide shunt loading of said network to thereby stabilize the interaction device, said attenuator being oriented for minimum interaction with the electron beam whereby the tendency of the attenuator to saturate is minimized.

15. In a traveling wave interaction device including means for producing a beam of electrons, a slow wave structure comprising a plurality of electron beam interaction elements surrounding the electron beam and oriented along the beam, a common conductor surrounding the interaction elements and oriented substantially coaxial to the interaction elements, a plurality of coupling means coupling each of said elements to the common conductor, said coupling means lying in substantially the same plane so that the eletcromagnetic fields associated with said elements and coupling means when an electromagnetic wave is propagated along the structure are substantially confined to the plane of the coupling means, the combination of the coupling means and interaction elements forming an effective periodic filter network, a conducting plate oriented substantially perpendicular to the electron beam and the plane of the coupling means and connected to the common conductor, an electromagnetic wave energy connector coupled to a portion of the slow wave structure, extending parallel to the conducting plate, perpendicular to said plane and through the common conductor to effect minimum interaction between the connector and the electromagnetic fields associated with adjacent portions, and an attenuator oriented to provide shunt loading of said network to thereby stabilize the interaction device, said attenuator being oriented to have minimum interaction with the electron beam whereby the tendency of the attenuator to saturate is minimized.

16. In a traveling-wave interaction device including means for producing a beam of electrons, a slow wave structure providing a plurality of filter sections spaced along said beam, said sections each including an element adjacent the beam path for interaction therewith and an elongated conductor surrounding the beam path and said elements, a coupling conductor extending between said interaction member and common conductor, the electromagnetic fields associated with each filter section of said slow wave structure being confined to the region surrounding said coupling conductor and means for coupling energy between an external circuit and one of said filter sections including a conductor extending from the interaction element of that section in a direction displaced from said coupling conductor to provide minimum direct coupling therebetween to minimize the effect of said coupling on the slow wave structure, said output coupling circuit having a characteristic impedance matching that of the slow wave structure.

17. A slow wave structure for interaction with an elongated electron beam comprising a plurality of filter sections, each including a cylindrical member surrounding the beam path and a coupling conductor extending outwardly from said cylindrical conductor, a generally cylindrical elongated conductor surrounding said first-mentioned cylindrical conductors and connected to the outer ends of said coupling conductors and an energy transfer circuit for transmitting energy between one of said sections and an external circuit comprising a conductor terminating on one of said cylindrical conductors and extending in a direction angularly displaced from said coupling conductors to provide minimum direct coupling therewith.

18. A slow wave structure for interaction with an elongated electron beam comprising a plurality of filter sections, each including a cylindrical member surrounding the beam path and a coupling conductor extending outwardly from said cylindrical conductor, a generally cylindrical elongated conductor surrounding said first-mentioned cylindrical conductors and connected to the outer ends of said coupling conductors and an energy transfer circuit for transmitting energy between one of said sections and an external circuit comprising a conductor terminating on one of said cylindrical conductors and extending in a direction angularly displaced from said coupling conductors to provide minimum direct coupling therewith, said conductor and the adjacent conductors of said slow wave structure providing a transmission line section which, when coupled to the external circuit, provide a characteristic impedance equal to that of the slow wave structure.

References Cited in the file of this patent

UNITED STATES PATENTS

| | | |
|---|---|---|
| 2,541,843 | Tiley | Feb. 13, 1951 |
| 2,575,383 | Field | Nov. 20, 1951 |
| 2,636,948 | Pierce | Apr. 28, 1953 |